July 13, 1943.        T. A. MILUTIN        2,324,316
CUTTING-OFF TOOL
Filed Aug. 1, 1941
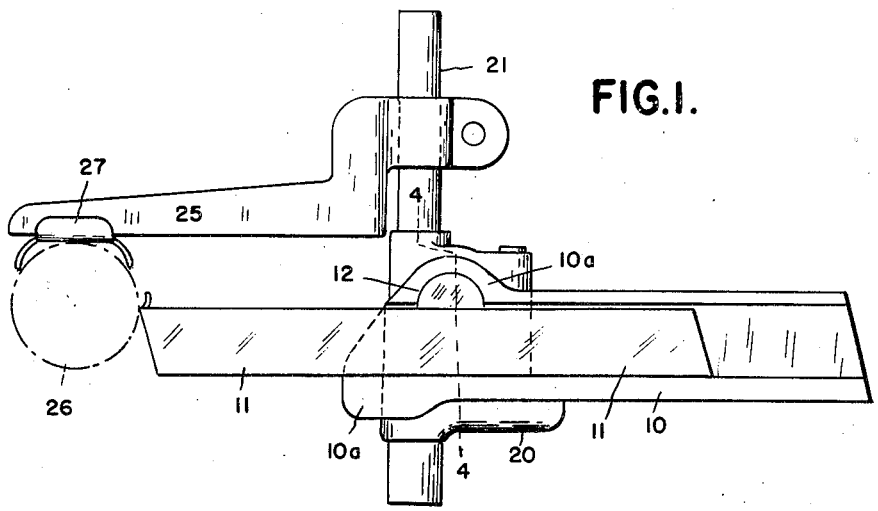
FIG.1.
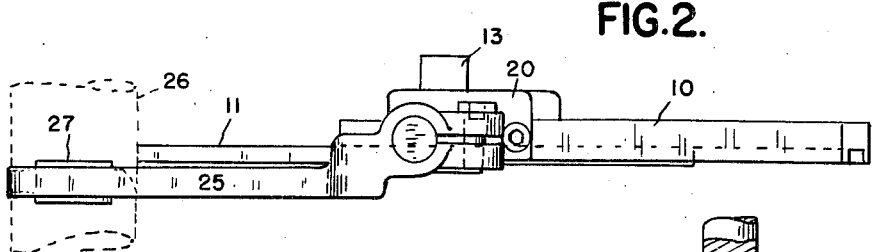
FIG.2.
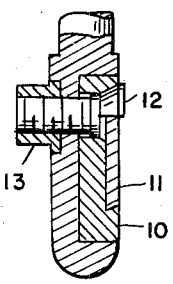
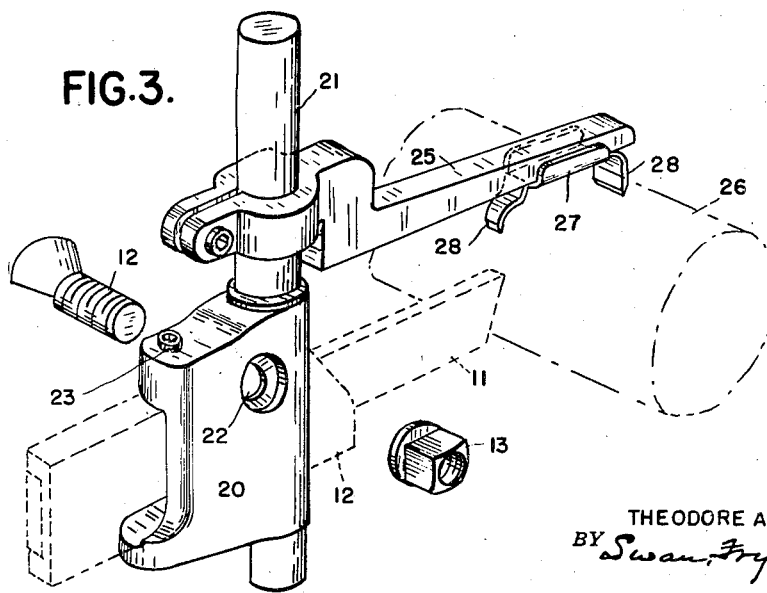
FIG.3.
FIG.4.
INVENTOR.
THEODORE A. MILUTIN
BY *Swan, Frye, & Hardesty*
ATTORNEYS Patented July 13, 1943

2,324,316

UNITED STATES PATENT OFFICE 2,324,316

CUTTING-OFF TOOL

Theodore A. Milutin, Dearborn, Mich.

Application August 1, 1941, Serial No. 405,065

2 Claims. (Cl. 82—35)

The present invention relates to cutting-off tools for use with lathes and the like, and more particularly to an attachment or adapter for use with a conventional cutting off tool, and has among its objects means whereby stock may be cut off accurately, smoothly and in less time than is now used for this purpose.

Another object is an attachment for the conventional tool, by the use of which larger stock may be cut than has heretofore been cut in a lathe.

Another object is an attachment for such tools which will prevent chatter and its consequent roughness of cut and danger of tool breakage.

Other objects will readily occur to those skilled in the art upon reference to the following description and the accompanying drawing, in which Figure 1 is a side elevation of a tool and the attachment.

Figure 2 is a top view thereof.

Figure 3 is a perspective of the same with certain parts in exploded arrangement.

Figure 4 is a section on line 4—4 of Figure 1.

In the drawing a conventional cutting-off tool is shown, the tool body being indicated at 10 with the actual tool or blade at 11, the clamping screw at 12, and the clamping nut at 13.

In use, the tool will be fixed in the conventional tool holder upon a lathe in the known manner.

Mounted upon the tool body 10 is shown the attachment which consists of a main or body portion 20, provided with a recess in one side shaped to receive the enlarged end 10a of the tool, and also provided with an upwardly extending, preferably cylindrical, standard 21. It is also preferred to provide the body portion 20 with a counterbored hole 22 registering with the hole, through the tool, for screw 12, and with a set screw 23 acting upon the top, or bottom, of the tool body 10.

Clamped at the desired height upon the standard 21 is an arm 25 having its lower face extending parallel to the upper face of the cutting blade 11. This arm may be adjusted to bear upon the upper side of stock 26 during a cutting-off operation, but it is preferred to provide a soft metal, for example, brass, saddle 27 between the arm 25 and the stock and to form on said saddle chip remover blades or fingers 28 to prevent chips accumulating under the arm 25 and abrading the stock or surface of the arm.

In using the device, the attachment is first fixed to the tool by means of the set screw 23 and the blade 11 arranged in suitable position to act on stock mounted in a lathe. The arm 25 is then adjusted so that it rests upon the saddle 27 which in turn rests upon the stock 26.

With the attachment described, stock may be set-up in a lathe and cut off, using an automatic feed for the tool, and the feed may be adjusted for a quite heavy cut without danger to the tool and without chatter.

Now having described the invention and the preferred embodiment thereof, it is to be understood that said invention is to be limited, not by the foregoing description, but only by the scope of the claims which follow.

I claim:

1. In combination with a cutting-off tool, means adapted to be fixed thereto and consisting of a body portion provided with a recess for receiving a portion of said tool, said body having an arm arranged to extend in fixed parallel relation to the tool and to extend over and bear upon the workpiece, means interposed between said arm and the workpiece for preventing the passage of chips under said arm, and means to fix said arm against movement relative to the tool.

2. In combination with a cutting-off tool, means adapted to be fixed thereto and consisting of a body portion provided with a recess for receiving a portion of said tool, said body having an arm arranged to extend in fixed parallel relation to the tool and to extend over and bear upon the workpiece, means interposed between said arm and the workpiece for preventing the passage of chips under said arm, and means to fix said arm against movement relative to the tool, said interposed means consisting of a saddle piece of softer material having downwardly extending chip removing blades arranged close to the workpiece.

THEODORE A. MILUTIN.